United States Patent
Chiao

(10) Patent No.: US 6,228,520 B1
(45) Date of Patent: May 8, 2001

(54) CONSINTERABLE CERAMIC INTERCONNECT FOR SOLID OXIDE FUEL CELLS

(75) Inventor: Yi-Hung Chiao, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 08/843,689

(22) Filed: Apr. 10, 1997

(51) Int. Cl.$^7$ ............... H01M 8/10; H01M 8/00
(52) U.S. Cl. ............... 429/32; 429/12
(58) Field of Search ............... 429/30, 32

(56) References Cited

U.S. PATENT DOCUMENTS

| 3,377,203 | 4/1968 | Mobius et al. | 136/86 |
| 3,460,991 | 8/1969 | White, Jr. | 136/86 |

(List continued on next page.)

FOREIGN PATENT DOCUMENTS

| 0 275 356 | 7/1988 | (EP) . |
| H3-81959 | 4/1991 | (JP) . |
| H5-54896 | 3/1993 | (JP) . |
| H5-325981 | 12/1993 | (JP) . |

OTHER PUBLICATIONS

Minh, "Ceramic Fuel Cells", J. Am. Ceram. Soc., 76[3], pp. 563–589, Oct. 1993.*

Tedmon, Jr., et al., "Cathode Materials and Performance in High–Temperature Zirconia Electrolyte Fuel Cells", *J. Electrochem. Soc.: Electrochecmical Science*, Sep. 1969, pp. 1170–1175.

(List continued on next page.)

Primary Examiner—Kathryn Gorgos
Assistant Examiner—Erica Smith-Hicks
(74) Attorney, Agent, or Firm—R. J. Edwards; Eric Marich; R. C. Baraona

(57) ABSTRACT

A composition which is densifiable at low temperatures in an air atmosphere suitable for use as an interconnect layer in a solid oxide fuel cell. Binary alloying of SrO and CaO with LaCrO$_3$ is used to form a compound having the general formula La$_{(1-x)}$(Sr,Ca)$_x$CrO$_3$ which is a stabilized form of LaCrO$_3$ and has the desirable properties for a fuel cell interconnect layer.

9 Claims, 1 Drawing Sheet

U.S. PATENT DOCUMENTS

| | | | |
|---|---|---|---|
| 3,522,097 | 7/1970 | Tedmon, Jr. et al. | 136/86 |
| 3,533,849 | 10/1970 | Mitoff | 136/86 |
| 3,573,993 | 4/1971 | Pabst et al. | 136/120 |
| 4,459,341 | 7/1984 | Marchant et al. | 429/33 |
| 4,631,238 * | 12/1986 | Ruka et al. | 429/30 |
| 4,686,158 | 8/1987 | Nishi et al. | 429/26 |
| 4,702,971 | 10/1987 | Isenberg | 429/31 |
| 4,749,632 * | 6/1988 | Flandermeyer et al. | 429/12 |
| 4,767,518 | 8/1988 | Maskalick | 204/242 |
| 4,770,955 | 9/1988 | Ruhl | 429/33 |
| 4,789,561 | 12/1988 | Schaefer et al. | 427/126.1 |
| 4,847,173 | 7/1989 | Mitsunaga et al. | 429/41 |
| 4,851,303 | 7/1989 | Madou et al. | 429/13 |
| 4,885,078 | 12/1989 | Spengler et al. | 204/432 |
| 4,894,297 | 1/1990 | Singh et al. | 429/31 |
| 4,948,680 | 8/1990 | Madou et al. | 429/13 |
| 4,997,725 | 3/1991 | Pujare et al. | 429/17 |
| 5,001,021 | 3/1991 | Maricle et al. | 429/13 |
| 5,021,304 | 6/1991 | Ruka et al. | 429/30 |
| 5,037,525 | 8/1991 | Badwal | 204/421 |
| 5,064,733 | 11/1991 | Krist et al. | 429/17 |
| 5,080,689 * | 1/1992 | Pal et al. | 29/623.5 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,143,751 * | 9/1992 | Richards et al. | 427/126.3 |
| 5,143,801 | 9/1992 | Bates | 429/33 |
| 5,298,235 | 3/1994 | Worrell et al. | 429/33 |
| 5,298,341 | 3/1994 | Khandkar et al. | 429/32 |
| 5,308,712 | 5/1994 | Seike et al. | 429/30 |
| 5,330,859 * | 7/1994 | McPheeters | 429/33 |
| 5,340,664 | 8/1994 | Hartvigsen | 429/20 |
| 5,342,704 | 8/1994 | Vasilow et al. | 429/31 |
| 5,342,705 * | 8/1994 | Minh et al. | 429/32 |
| 5,356,730 * | 10/1994 | Minh et al. | 429/32 |
| 5,366,819 | 11/1994 | Hartvigsen et al. | 429/17 |
| 5,385,792 | 1/1995 | Shiratori et al. | 429/32 |
| 5,403,461 | 4/1995 | Tuller et al. | 204/252 |
| 5,409,785 | 4/1995 | Nakano et al. | 429/33 |
| 5,432,023 | 7/1995 | Yamada et al. | 429/34 |
| 5,432,024 | 7/1995 | Soma et al. | 429/44 |
| 5,453,330 | 9/1995 | Kawasaki et al. | 429/30 |
| 5,464,654 | 11/1995 | Mizuno | 427/123 |
| 5,480,738 | 1/1996 | Elangovan et al. | 429/32 |
| 5,516,597 * | 5/1996 | Singh et al. | 429/30 |
| 5,543,239 | 8/1996 | Virkar et al. | 429/33 |
| 5,612,149 | 3/1997 | Hartvigsen et al. | 429/26 |
| 5,614,127 * | 3/1997 | Khandkar et al. | 252/519 |
| 5,620,807 | 4/1997 | Mussell et al. | 429/33 |
| 5,807,642 * | 9/1998 | Xue et al. | 429/33 |
| 5,935,727 * | 8/1999 | Chiao | 429/32 |
| 6,054,231 * | 1/2000 | Virkar et al. | 429/34 |

OTHER PUBLICATIONS

Takeda, et al., "Cathodic Polarization Phenomena of Perovskite Oxide Electrodes with Stabilized Zirconia", *J. Electrochem. Soc.: Electrochemical Science and Technology*, Sep. 1987, pp. 2656–2661.

Ishihara et al., "Doped Perovskite Oxide, $PrMnO_3$, as a New Cathode for Solid–Oxide Fuel Cells that Decreases the Operating Temperature", *J. Am. Ceram. Soc.*, vol. 77, No. 6, Jun. 1994, pp. 1682–1684.

Yamamoto et al., "Perovskite–Type Oxides as Oxygen Electrodes for High Termperature Oxide Fuel Cells", *Solid State Ionics* 22, Elsevier Science Publishers B.V., North–Holland, Amsterdam No month available, (1987), pp. 241–246.

Kamata et al., "Oxygen Reduction Behaviour at the Co–Fired $La_{0.8}Sr_{0.2}MnO_3$/YSZ Interface, as an SOFC Air Electrode", Proceedings of the 1st European Solid Oxide Fuel Cell Forum, Oct. 3–7, 1994, Lucerne–Switzerland, pp. 725–733.

Minh, "Ceramic Fuel Cells", *J. Am. Ceram. Soc.*, 76[3], 1993, No month available pp. 563–589.

Uchida et al., "New Preparation Method for Polymer–Electrolyte Fuel Cells", *J. Electrochem. Soc.*, vol. 142, No. 2, Feb. 1995, pp. 463–468.

Tai et al., "Tape Casting and Sintering of Strontium–Doped Lanthanum Chromite for a Planar Solid Oxide FuelCell Bipolar Plate", *J. Am. Ceram. Soc.*, 74[1], 1991, pp. 155–160 No month available.

Hayashi et al., "Sintering of Lanthanum Chromite Doped with Zinc or Copper", *Journal of Materials Science Letters*, 7, 1988, pp. 457–448, No month available.

Sakai et al., "Sinterability and Electrical Conductivy of Calcium–doped Lanthanum Chromites", *Journal of Materials Science*, 25, 1990, pp. 4531–4534 No month available.

Kawada et al., "Fabrication of a Planar Solid Oxide Fuel Cell by Tape–Casting and Co–Firing Method", *Journal of the Ceramic Society of Japan*, 100[6], 1992, pp. 847–850 No month available.

Meadowcraft et al., "Oxidation and Vaporization Processes in Lanthanum Chromite", *Ceramic Bulletin*, vol. 58, No. 6, 1979, pp. 610–615 No month available.

Yokokawa et al., "Thermodynamic Stabilities of Perovskite Oxides for Electrodes and Other Electrochemical Materials", *Solid State Ionics*, 52, 1992,. pp. 43–56 No month available.

Chemical Abstract, 94:161192/20 (1994) No month available.

Chemical Abstract, 88:206576/30 (1988) No month available.

Chemical Abstract, 90: 129770/17 (1990) No month available.

Chemical Abstract, 94: 079443/10 (1994) No month available.

Chemical Abstract, 93: 325981 (1993) No month available.
Chemical Abstract, 93: 029003 (1993) No month available.
Chemical Abstract, 91: 081959 (1991) No month available.
Chemical Abstract, 94: 071641/09 (1994) No month available.

Chemical Abstract, 91: 059953 (1991) No month available.
Chemical Abstract, 93: 054896 (1993) No month available.
Derwent 89–141951/19—Abstract of JP 01–087,545 , 1989.
Derwent 90–302452/40—Abstract of JP 02–215,005 1990.
Derwent 90–302453/40—Abstract of JP 02–215,005 1990.
Derwent 90–338562/45—Abstract of JP 02–243,768 1990.
Derwent 90–338563/45—Abstract of JP 02–243,769 1990.
Derwent 92–180619/22—Abstract of JP 04–118–866 1992.
Berard, *J. Solid State Chem.*, 1991, 90 (1), 126–46 (CA 114:92581p).

Hayami et al., *Osaka Kogyo Gijutsu Shikenso Kiho 1977*, 28(2), 98–106 (CA 87:174788z).

Jakobs, et al., *Rev. Chim. Miner.*, 1980, 17(4), 283–98 (CA 94:54839q).

Ohno et al., *Koen Yoshishu—Kotai Ionikusu Toronkai, 7th*, 1979, 49–50 (CA 92:132003n).

* cited by examiner

CONSINTERABLE CERAMIC INTERCONNECT FOR SOLID OXIDE FUEL CELLS

FIELD AND BACKGROUND OF THE INVENTION

This invention relates to planar solid oxide fuel cell stacks comprising one or more electrodes in contact with a solid state electrolyte and in particular to a new interconnect for solid oxide fuel cells.

A solid state electrochemical cell comprises two electrodes, the anode and the cathode, and a dense solid electrolyte membrane which separates the anode and cathode regions of the cell. The anodic and cathodic reactions occur at the anode/electrolyte and cathode/electrolyte interfaces, respectively. The solid electrolyte membrane is a material capable of conducting ionic species, such as oxygen ions, sodium ions, fluoride ions, or hydrogen ions, yet has a low electrical conductivity. The electrolyte membrane must be impermeable to the electrochemical reactants.

It is known to prepare a solid oxide fuel cell comprising a dense electrolyte membrane of a ceramic oxygen ion conductor, a porous anode layer of a conductive ceramic or a metal or, most commonly, a ceramic-metal composite, in contact with the electrolyte membrane on the fuel side of the cell, and a porous cathode layer of an electronically-conductive metal oxide on the oxidant side of the cell, which generates electricity through the electrochemical reaction between a fuel and an oxidant. This net electrochemical reaction involves charge transfer steps that occur at the interface between the ionically-conductive electrolyte membrane, the electronically-conductive electrode and the gas phase (fuel or oxygen).

Electrode structures comprising a porous layer of electrolyte particles on a dense electrolyte membrane with electrocatalyst material on and within the porous layer of electrolyte are known. In such electrodes, the electrocatalyst material is semi-continuous on the surface of the porous electrolyte material to create a three phase boundary (TPB) where the electrolyte material, electrocatalyst, and gas are in contact. The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics. For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

U.S. Pat. No. 3,377,203 discloses a method for producing fuel cells of solid electrolyte and ceramic oxide electrode layers by sintering the electrode layers to the electrolyte. U.S. Pat. No. 4,767,518 discloses a solid oxide electrode (anode) made of metal particles that are immobilized by stabilized zirconia which may also contain praseodymium (Pr). The Pr may be added in the form of a solution. U.S. Pat. No. 4,885,078 discloses an electrochemical device which may be a solid oxide cell which comprises a porous electrode containing a deposit of metal oxide or metal salt capable of forming metal oxide upon heating, where the metal may be Pr. U.S. Pat. No. 5,021,304 discloses a method of coating a separate electronically conducted layer on a porous electrode having the steps of applying a mixture of metal salts including nitrates to the electrodes with a surfactant, and heating to form the oxides. Pr oxide is included in a list of dopant oxides which may be used.

The total amount of energy produced by a solid state fuel cell can be increased by stacking the cells anode to cathode. Interconnect layers are placed between the anode and cathode layers of adjacent cells to provide electrical connection from cell to cell and to serve as a barrier between the cells to prevent the migration of fuel or oxidant therebetween.

$LaCrO_3$ is difficult to keep from evaporating in an air atmosphere and must be sintered at relatively high temperatures. An interconnect material which sinters at a relatively low temperature, has a high electrical conductivity, and is impermeable to the fuel and oxidant would be desirable.

SUMMARY OF THE INVENTION

It is an object of the present invention to provide a fuel cell interconnect layer composed of $LaCrO_3$ which can be used with solid oxide fuel cells to enhance the production of stacks of multiple cells in a single-step cofiring process.

It is a further object to provide an interconnect layer which has shrinkage properties during firing that closely match other fuel cell components.

Accordingly, a composition which is densifiable at a relatively low temperature which is suitable for sintering other cell components in an air atmosphere and suitable for use as an interconnect layer in a solid oxide fuel cell is provided. Binary alloying of SrO and CaO with $LaCrO_3$ is used to form a compound having the general formula $La_{(1-x)}(Sr,Ca)_xCrO_3$ which is a stabilized form of $LaCrO_3$ and has the desirable properties for a fuel cell interconnect layer. In the above formula, x is a number from 0.05 to 0.5. Preferably, x is at least 0.15, more preferably at least 0.2, most preferably at least 0.25; but is preferably no greater than 0.45, and more preferably no greater than 0.3. The molar ratio of Ca:Sr is preferably at least 1:3, more preferably at least 1:2, most preferably at least 1:1; but is preferably no greater than 3:1, more preferably no greater than 2:1.

The interconnect layer of the invention is particularly useful in the preparation of a fuel cell wherein the different components of the fuel cell (anode, cathode, electrolyte, and interconnect) are sintered as a single unit. In such cases, the use of an interconnect which will sinter at a relatively low temperature but still have acceptable properties of an interconnect (barrier for gases, good electrical conductivity; and little or no reactivity with the gases or adjacent components in the fuel cell) is preferred.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENTS

Figure 1:
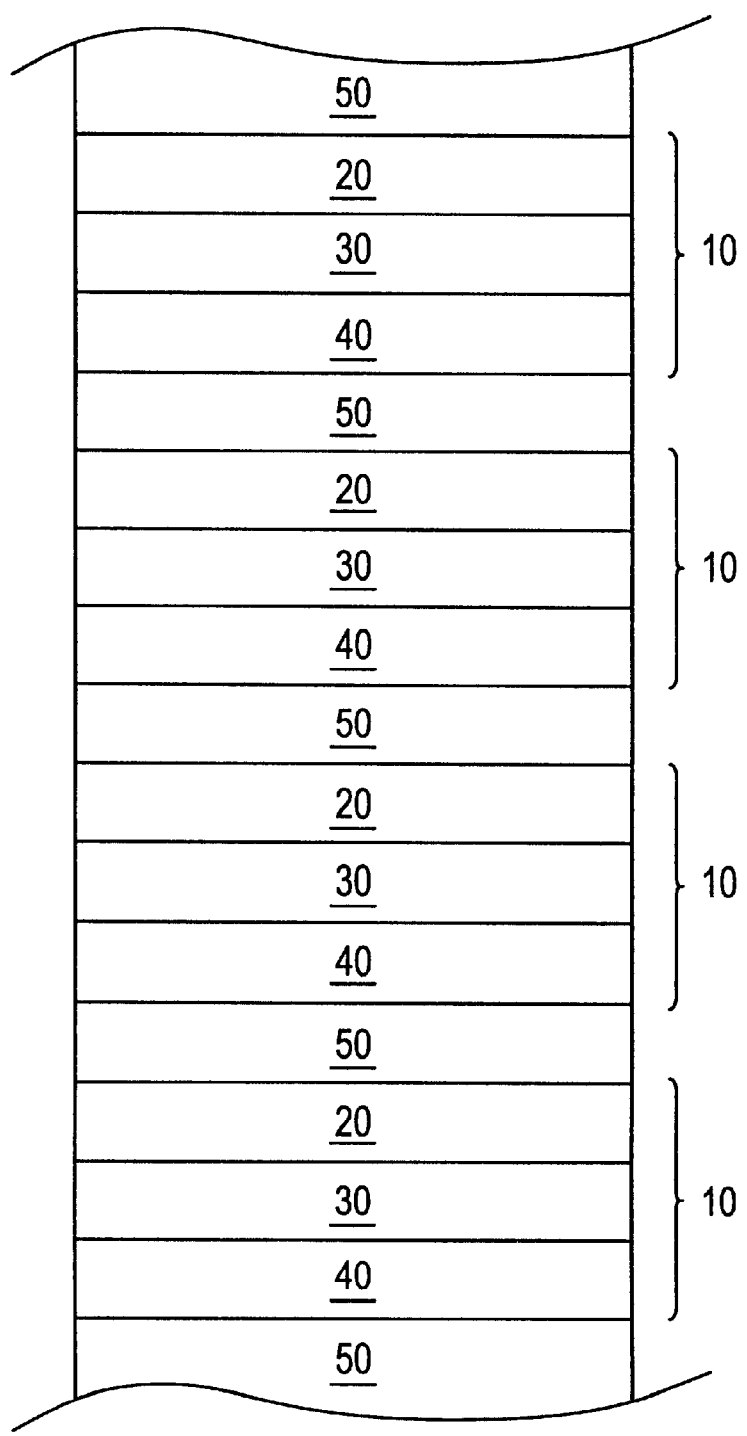
FIG. 1 is a schematic representation of the placement of an interconnect layer according to the invention in a solid oxide fuel cell.

Referring to the drawing, a plurality of stacked solid oxide fuel cells 10 are shown separated by interconnect layers 50.

Each fuel cell 10 is composed of an anode 20, electrolytic layer 30, and a cathode 40. The anode 20, cathode 40 and electrolytic layer 30 are formed from known materials using known solid oxide fuel cell techniques. The layers are not shown to scale. Common thicknesses for each layer are 0.015" for the anode 20, 0.002" for the electrolytic layer 30, 0.015" for the cathode 40, and 0.045" for the interconnect layer 50.

The interconnect layers 50 are composed of a compound having the general formula $La_{(1-x)}(Sr,Ca)_xCrO_3$. In the above formula, x is a number from 0.05 to 0.5. Preferably, x is at least 0.15, more preferably at least 0.2, most preferably at least 0.25; but is preferably no greater than 0.45, and more preferably no greater than 0.3, and most preferably no greater than 0.2. The molar ratio of Ca:Sr is preferably at least 1:3, more preferably at least 1:2, most preferably at least 1:1; but is preferably no greater than 3:1, more preferably no greater than 2:1. This compound is a stabilized form of $LaCrO_3$ which can be densified at a temperature of about 1350° C. in air and which exhibits high electrical conductivity. The interconnect 50 has a shrinkage rate during sintering and firing which closely matches many known electrolyte and electrode materials commonly used in solid state fuel cells.

The interconnect composition 50 allows a solid oxide fuel cell stack to be cofired at temperatures of approximately 1350° C. in one of air, $N_2$, or controlled $PO_2$.

The interconnect 50 is created by binary alloying SrO and CaO with $LaCrO_3$ to form $La_{(1-x)}(Sr,Ca)_xCrO_3$. This composition is stabilized and will not evaporate in air, and can be densified to near theoretical values.

Examples of the production of a fuel cell stack using the interconnect 50 of the invention follow. In each case the electrolyte was $ZrO_2$-8 mole % $Y_2O_3$, the cathode was 100 parts by weight each of $La_{0.8}Sr_{0.2}MnO_3$ and $ZrO_2$-8 mole % $Y_2O_3$, and the anode was 250 parts by weight of NiO (about 200 parts by weight of reduced nickel) and 150 parts by weight $ZrO_2$-8 mole % $Y_2O_3$.

EXAMPLE 1

100 parts by weight of $La_{0.8}Sr_{0.2}CrO_3$ was combined with 5 parts of $CaCO_3$ and dry pressed into pellets using 2% by weight poly vinyl butyryl as a binder, 38% by weight of 50/50 MEK/2-propanol as a solvent, drying the solution for one hour in air at between 90° and 100° C., and then exerting a uniaxial force of about 16.6 ksi on the composition.

The dry pellets were then sintered to form a dense interconnect of $La_{0.73}Sr_{0.18}Ca_{0.19}CrO_3$ in an air atmosphere using $ZrO_2$ setters by increasing the temperature 5° C./minute between 25° C. and 300° C., 2° C./minute from 300° C. to 900° C., holding the temperature for 1 hour, increasing the temperature 5° C./minute from 900° C. to 1350° C., holding the temperature for 2 hours, then cooling at 5° C./minute to 50° C.

EXAMPLE 2

A fuel cell is prepared by cosintering a multi-layer assembly of the following materials. The individual layers of unsintered materials are prepared by standard tape-casting methods.

| | |
|---|---|
| Interconnect (I) | 0.045 inch thick unsintered layer of a mixture of 100 parts by weight (pbw) of $La_{0.8}Sr_{0.2}CrO_3$ (available from Seattle Specialty Ceramics) and 5 pbw of $CaCO_3$. |
| Electrolyte (E) | 0.002 inch thick unsintered layer of a mixture of 92 mole percent $ZrO_2$ and 8 mole percent $Y_2O_3$ (available as a mixture from Tosoh as TZ-8Y). |
| Cathode (C) | 0.015 inch thick layer of a mixture of 100 pbw of $La_{0.8}Sr_{0.2}MnO_3$ (Seattle Specialty Ceramics, presintered at 1100° C.) and 100 pbw of a mixture of 92 mole percent $ZrO_2$ and 8 mole percent $Y_2O_3$ (Tosoh, TZ). |
| Anode (A) | 0.0015 inch thick layer of a mixture of 250 pbw of NiO (Alfa Chemicals) and 150 pbw of a mixture of 92 mole percent $ZrO_2$ and 8 mole percent $Y_2O_3$ (Tosoh, TZ-8Y). |

3 inch by 3 inch portions of the tapes are arranged in the following sequence:—IAECIAECI—and laminated using an isotactic laminator (available from Pacific Trinetics Corporation, Carlsbad, Calif.) for 6 minutes with 2 ksi pressure. Air and fuel channels are built in at the green stage by laser machining the green tapes and replacing the portion cut away with a transient spacer which can be removed after lamination by mechanical means or pyrolysis.

The laminate is sintered using $ZrO_2$ setters according to the following heating schedule: the laminate is heated to 300° C. and the temperature is then increased at 5° C./min until reaching 900° C.; held at 900° C. for 1 hour; increased 5° C./min to 1350° C. for 2 hours, then cooled at 5° C./min at 50° C. to form a 2-cell solid oxide fuel cell "stack".

While a specific embodiment of the invention has been shown and described in detail to illustrate the application of the principles of the invention, it will be understood that the invention may be embodied otherwise without departing from such principles.

What is claimed is:

1. A solid oxide fuel cell stack with cosinterable components and an improved interconnect layer consisting of:
    a plurality of fuel cells having an anode, a cathode, and an electrolytic layer interposed between the anode and the cathode and the anode, the cathode, and the electrolytic layer possessing a definite shrinkage property when simultaneously co-sintered; and
    an improved interconnect layer interposed between the fuel cells having a composition of the general formula $La_{(1-x)}(Sr+Ca)_xCrO_3$, wherein x is a number from 0.05 to 0.5; wherein the improved interconnect layer is densifiable at a relatively low temperature which is suitable for a simultaneous co-sintering, as a single unit, of the anode, the cathode, the electrolytic layer and the improved interconnect layer in an air atmosphere; and wherein the improved interconnect layer acts as a barrier to gases introduced into the fuel cell stack, has good electrical conductivity, and does not react with gases introduced into the fuel cell stack.

2. A fuel cell stack according to claim 1, wherein x is 0.2.

3. A fuel cell stack according to claim 1, wherein the improved interconnect layer exhibits a shrinkage property during the simultaneous co-sintering that is substantially the same as the shrinkage property of the fuel cells.

4. A fuel cell stack according to claim 1, wherein the relatively low temperature which is suitable for a simultaneous co-sintering, as a single unit, with the anode, the cathode, the electrolytic layer, and the improved interconnect layer in an air atmosphere comprises approximately 1350° C.

5. A fuel cell stack according to claim 1, wherein the Ca:Sr ratio is between 1:1 and 3:1.

6. A method of forming a solid oxide fuel cell stack with improved densification and conductivity of the interconnect layer, the method comprising:

provautomating an amount of $LaCrO_3$;

providing an alloying amount of a binary sintering aid composition;

forming an interconnect layer composition having the general formula $La_{(1-x)}(Sr+Ca)_xCrO_3$ from the amount of $LaCrO_3$ and the alloying amount of binary sintering aid composition, wherein x is a number from 0.05 to 0.5;

providing an anode layer composition;

providing a cathode layer composition;

providing an electrolytic layer composition; and tape-laminating and simultaneously co-sintering as a single unit the anode layer composition, the electrolytic layer composition, the cathode layer composition and the interconnect layer composition in one of air, $N_3$, and controlled $PO_2$ at a temperature of approximately 1350° C. to form a plurality of fuel cells separated by a plurality of interconnect layers.

7. A method of forming a fuel cell stack according to claim 6, wherein x is 0.2.

8. A method of forming a fuel cell stack according to claim 6, further comprising selecting an interconnect layer composition which exhibits a shrinkage property during the tape-laminating and simultaneously co-sintering substantially the same as a shrinkage property exhibited by the anode layer composition, the cathode layer composition, and the electrolytic layer composition.

9. A method according to claim 6, wherein the Ca:Sr ratio is between 1:1 and 3:1.

* * * * *